(12) United States Patent
Williams et al.

(10) Patent No.: US 11,772,806 B2
(45) Date of Patent: Oct. 3, 2023

(54) AIRCRAFT ENGINE NACELLE WITH AN AFT END MAJOR AXIS SUBSTANTIALLY PARALLEL TO THE LEADING EDGE OF A WING

(71) Applicant: AIRBUS OPERATIONS LIMITED, Bristol (GB)

(72) Inventors: Geoffrey Richard Williams, Bristol (GB); Ross Salisbury, Bristol (GB); Antony Peacock, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 308 days.

(21) Appl. No.: 17/262,631

(22) PCT Filed: Jul. 10, 2019

(86) PCT No.: PCT/EP2019/068489
§ 371 (c)(1),
(2) Date: Jan. 22, 2021

(87) PCT Pub. No.: WO2020/020637
PCT Pub. Date: Jan. 30, 2020

(65) Prior Publication Data
US 2021/0316871 A1 Oct. 14, 2021

(30) Foreign Application Priority Data

Jul. 23, 2018 (GB) ...................................... 1811992

(51) Int. Cl.
*B64D 29/02* (2006.01)
*B64C 7/02* (2006.01)
(Continued)

(52) U.S. Cl.
CPC ................ *B64D 29/02* (2013.01); *B64C 7/02* (2013.01); *B64D 27/18* (2013.01); *B64D 33/02* (2013.01);
(Continued)

(58) Field of Classification Search
CPC ............ B64D 27/18; B64D 2033/0226; B64D 2033/0273; B64C 7/02
(Continued)

(56) References Cited

U.S. PATENT DOCUMENTS 5,058,379 A * 10/1991 Lardellier ............... F02K 3/077
60/268
5,369,954 A * 12/1994 Stuart ...................... F02K 1/52
239/265.17
(Continued)

FOREIGN PATENT DOCUMENTS

DE 690 02 187 11/1993
EP 2 098 714 9/2009
(Continued)

OTHER PUBLICATIONS

International Search Report and Written Opinion for PCT/EP2019/068489 dated Aug. 27, 2019, 19 pages.
(Continued)

*Primary Examiner* — Brady W Frazier
(74) *Attorney, Agent, or Firm* — Nixon & Vanderhye P.C.

(57) ABSTRACT

An aircraft engine nacelle for coupling to a wing of an aircraft is disclosed having a fore end, and an aft end that is immoveable relative to the fore end. The aft end includes a major axis Mj and a minor axis Mi, and the nacelle is configured such the minor axis Mi is closer to vertical V than the major axis Mj when the nacelle is coupled to the wing
(Continued)

and the aircraft is stationary on the ground. An aircraft system and an aircraft are disclosed each including the aircraft engine nacelle.

20 Claims, 7 Drawing Sheets

(51) Int. Cl.
  *B64D 27/18* (2006.01)
  *B64D 33/02* (2006.01)
(52) U.S. Cl.
  CPC ............... *B64D 2033/0226* (2013.01); *B64D 2033/0273* (2013.01)
(58) Field of Classification Search
  USPC ........................................... 244/53 B
  See application file for complete search history.

(56) References Cited

U.S. PATENT DOCUMENTS

| | | | | |
|---|---|---|---|---|
| 7,845,156 | B2* | 12/2010 | Bigot | F02K 1/40 60/770 |
| 8,418,953 | B2* | 4/2013 | Smith | F02C 7/04 137/15.1 |
| 2004/0140397 | A1* | 7/2004 | Dun | B64C 7/02 244/55 |
| 2005/0211824 | A1* | 9/2005 | Howarth | B64D 33/04 244/12.5 |
| 2006/0185346 | A1* | 8/2006 | Rolt | F02K 3/06 60/226.1 |
| 2009/0226297 | A1* | 9/2009 | Yanagi | F02K 3/065 415/220 |
| 2011/0243719 | A1* | 10/2011 | Murphy | F01D 25/24 415/182.1 |
| 2017/0037813 | A1 | 2/2017 | Dindar et al. | |
| 2017/0166318 | A1 | 6/2017 | Holt et al. | |
| 2019/0016471 | A1* | 1/2019 | Lieser | F02K 1/40 |

FOREIGN PATENT DOCUMENTS

| | | |
|---|---|---|
| EP | 2371714 | 10/2011 |
| EP | 3 179 083 | 6/2017 |
| EP | 3 187 723 | 7/2017 |
| FR | 3 012 417 | 5/2015 |
| GB | 2 064 005 | 6/1981 |
| GB | 2 259 115 | 3/1993 |

OTHER PUBLICATIONS

Great Britain Examination Report for GB1811992.5 dated Jan. 22, 2019, 9 pages.

Honig, "Exclusive Look Inside United's Very First Boeing 737 MAX", The Points Guy, Retrieved from the Internet on Aug. 9, 2019, <https://thepointsguy.com/reviews/united-737-max-tour/>, 31 pages.

* cited by examiner

AIRCRAFT ENGINE NACELLE WITH AN AFT END MAJOR AXIS SUBSTANTIALLY PARALLEL TO THE LEADING EDGE OF A WING

CROSS REFERENCE TO RELATED APPLICATIONS

The present application is a National Phase of International Application Number PCT/EP2019/068489 filed Jul. 10, 2019, which designated the U.S. and claims priority benefits from Great Britain Patent Application Number GB 1811992.5 filed Jul. 23, 2018, the entire contents of each of which are hereby incorporated by reference.

TECHNICAL FIELD

The present invention relates to an aircraft engine nacelle.

BACKGROUND

An aircraft engine nacelle is designed to house an engine, such as a jet engine, in an aerodynamically efficient manner. The nacelle shields other parts of the aircraft, such as the fuselage and wing, from the engine. For example, the flow of high temperature exhaust gases and transmission of engine noise are influenced by the presence of the nacelle. The nacelle impacts fuel consumption because the nacelle creates drag during flight of the aircraft. In some instances, the nacelle is mounted under the wing. A wing is said to have a leading edge, a trailing edge, an under (i.e. lower) surface, an over (i.e. upper) surface, a root and a tip. The leading edge is located at the front of the wing, and the trailing edge is located at the rear of the wing. In flight, air is first disturbed by the leading edge of the wing and is directed around the wing by an under surface of the wing and an over surface of the wing and directed towards the trailing edge. This air flow scenario occurs along the wing from a position proximal a fuselage (inbound) at the root of the wing to a position distal the fuselage (outbound) at the tip of the wing.

In some instances, a wing of an aircraft comprises a leading-edge device or leading-edge moveable, such as a slat or a flap, which is designed to move relative to a main body of the wing. A leading-edge moveable is designed to interact with the airflow around the wing to further influence the flow of air. In a high-lift scenario, for example during take-off of the aircraft, a leading-edge moveable may be extended away from the wing, outwardly and/or downwardly, to disrupt airflow and generate greater lift than in a retracted position. The leading-edge moveable may then retract when the aircraft is in a low-lift scenario, such as cruising.

SUMMARY

A first aspect of the present invention provides an aircraft engine nacelle for coupling to a wing of an aircraft. The nacelle comprises a fore end and an aft end that is immoveable relative to the fore end. The aft end comprises a major axis and a minor axis. The nacelle is configured such the minor axis is closer to vertical than the major axis, when the nacelle is coupled to the wing and the aircraft is stationary on the ground. Optionally, the major axis is closer to horizontal than the minor axis, when the nacelle is coupled to the wing and the aircraft is stationary on the ground.

Optionally, a length of the minor axis is 1% to 30% less than a length of the major axis. Optionally, a length of the minor axis is 1 to 10% less than a length of the major axis. Optionally, the length of the minor axis is 1% to 5% less than the length of the major axis.

Optionally, an extent of the major axis is closer to an inbound side of the nacelle than the minor axis.

Optionally, the aft end comprises an opening facing towards an inbound side of the nacelle.

Optionally, the major axis comprises a fore extent that is closer to the fore end than an aft extent of the major axis.

Optionally, an angle between the aft end and a plane transverse to the nacelle is less than or equal to 40 degrees. Optionally, the angle between the end aft and the plane is in the range 5 degrees to 35 degrees.

Optionally, the aft end comprises a scarf nozzle, the scarf nozzle comprises the major and minor axes, and a majority of the scarf nozzle is above a central axis of the nacelle.

Optionally, the major axis is substantially parallel to a leading edge of the wing, when the nacelle is coupled to the wing.

A second aspect of the present invention provides an aircraft system comprising: the aircraft engine nacelle according to the first aspect, and an engine within the nacelle. The major and minor axes of the nacelle pass through a longitudinal axis of the engine.

Optionally, the engine has a complementary shape to the aft end in a region enclosed by the aft end such that a periphery of the engine in the region comprises a corresponding major axis and minor axis.

A third aspect of the present invention provides an aircraft comprising the aircraft engine nacelle according to the first aspect or the aircraft system according to the second aspect, and a wing coupled to the nacelle.

Optionally, an extent of the minor axis is closer to the wing than an extent of the major axis.

Optionally, an extension of the minor axis intersects an extension of the wing.

Optionally, the major axis is complementary in direction to a direction of the wing. Optionally, the direction of the wing is a direction of a leading edge of the wing.

Optionally, an angular displacement between the major axis and the leading edge of the wing is less than or equal to 15 degrees. Optionally, the angular displacement is less than or equal to 5 degrees.

Optionally, the minor axis is fore of a leading edge of the wing.

Optionally, the aft end of the nacelle is fore of the leading edge of the wing.

Optionally, an extent of the minor axis is up to two times further forward of the leading edge of the wing than the extent is below the leading edge of the wing. Optionally, an extent of the minor axis is a factor of 0.1 to 2 times further forward of the leading edge of the wing than the extent is below the leading edge of the wing. Optionally, an extent of the minor axis is a factor of 0.5 to 2 times further forward of the leading edge of the wing than the extent is below the leading edge of the wing. Optionally, an extent of the minor axis is a factor of 0.5 to 1 times further forward of the leading edge of the wing than the extent is below the leading edge of the wing. Optionally, an extent of the minor axis is at least one times further forward of the leading edge of the wing than the extent is below the leading edge of the wing. Optionally, an extent of the minor axis is sustainably one to two times further forward of the leading edge of the wing than the extent is below the leading edge of the wing. Optionally, an extent of the minor axis is sustainably two times further forward of the leading edge of the wing than the extent is below the leading edge of the wing.

Optionally, the major axis is closer to a direction parallel to the wing than the minor axis. Additionally, or alternatively, the minor axis may be closer to a direction perpendicular to the wing than the major axis.

A fourth aspect of the present invention provides an aircraft engine nacelle for installing to a wing of an aircraft. The nacelle comprises an inlet and an outlet. The outlet is permanently fixed with respect to the inlet. The outlet comprises a first dimension in a first direction and a second dimension in a second direction orthogonal to the first direction. The first dimension is greater than the second dimension. The first direction is more closely aligned to a wing direction than the second direction is aligned to the wing direction, when the nacelle is installed on the wing of the aircraft, wherein the wing direction is a direction between a root and a tip of the wing.

BRIEF DESCRIPTION OF THE DRAWINGS

Embodiments of the invention will now be described, by way of example only, with reference to the accompanying drawings, in which:

FIG. 1a is a partial schematic top view of an aircraft comprising a wing, a pylon, an aircraft engine nacelle and an engine;

FIG. 1b is a schematic representation of a shape of an end of the aircraft engine nacelle looking in direction B of FIG. 1a;

FIG. 1c is a schematic representation of a shape of an end of the aircraft engine nacelle looking in direction A of FIG. 1a;

FIG. 2 is a schematic top view of portions of the aircraft engine nacelle of FIG. 1a;

DETAILED DESCRIPTION

In some instances, a nacelle is circular-symmetric because this is believed to be aerodynamically efficient, which helps with reducing fuel consumption. When mounted on an aircraft, a nacelle can impact wing performance, especially when the nacelle is located close to a surface of a wing.

In some instances, the nacelle is positioned close to a leading edge of the wing, which influences the location of a leading-edge moveable, such as a slat or a flap. In some instances, the leading-edge moveable is not positioned between parts of the nacelle and the wing, for example, in the region of coupling between the nacelle and wing due to the presence of a coupling structure, such as a pylon. The position of the nacelle therefore has an impact on an extent of the leading-edge moveable. For aircraft with a nacelle positioned close to a wing, the leading-edge moveable may comprise a "cut-back". A "cut-back" is a region of lessened extent of the leading-edge moveable. The "cut-back" may further contribute to the high-lift scenario, albeit to a lesser extent.

Demands in aircraft performance and fuel efficiency have created a drive for higher bypass engines. It generally takes less energy to move a greater mass slowly, than a smaller mass quickly. Further, high lift-to-drag wings could improve efficiency. Therefore, any reductions in the need for a slat or flap "cut-back" are desirable.

Figures 1A, 1B, 1C:
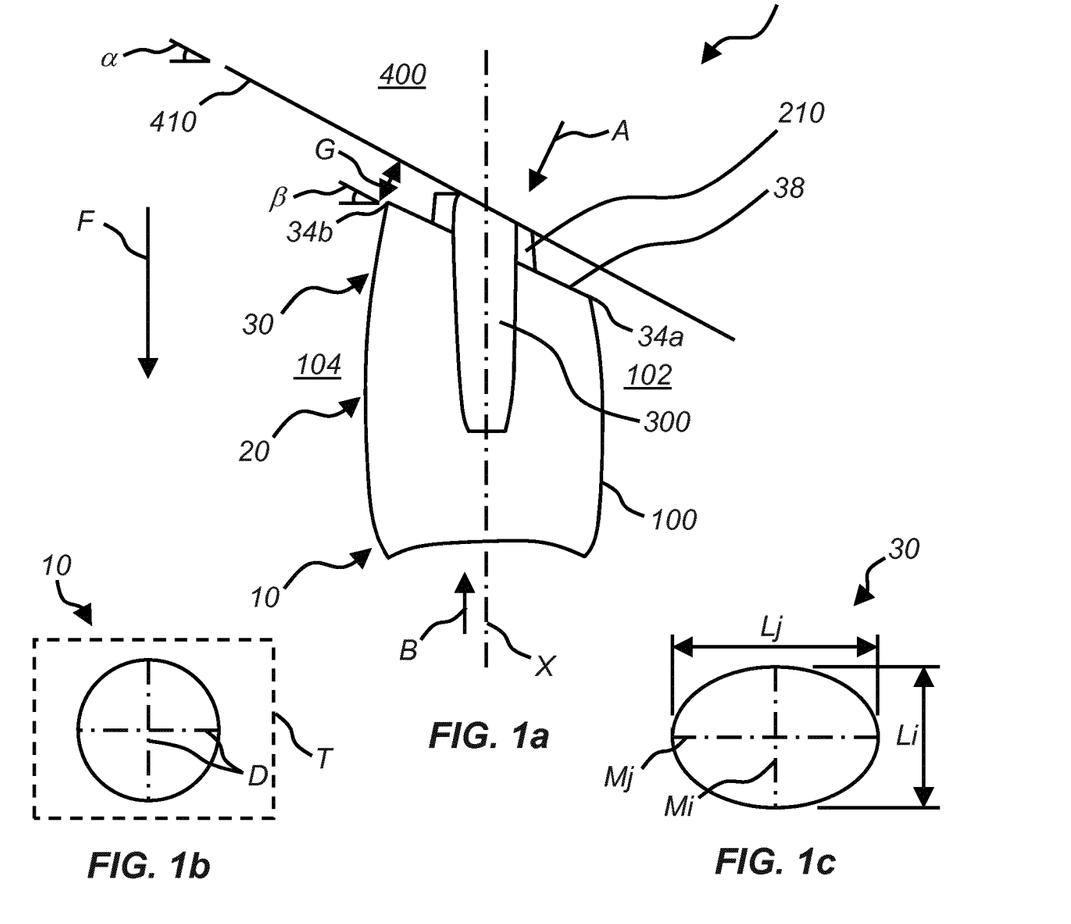

FIG. 1a shows a partial schematic top view of an aircraft 1 looking down towards an upper side of the aircraft 1. Such a view is typical when the aircraft 1 is stationary on the ground. The aircraft 1 comprises an aircraft engine nacelle 100, a pylon 300 and a wing 400. The nacelle 100 is a housing that is configured to encircle an engine 200 (see FIG. 3 to FIG. 5), such as a jet engine. The engine 200 is configured to provide the propulsive force to move the aircraft forward in a forward direction F, which may also be referred to as the fore direction. As the nacelle 100 is configured to enclose a majority of the engine 200, including a combustion zone of the engine 200, only an engine exhaust 210 is visible in the orientation shown in FIG. 1a. The pylon 300 is configured to couple the nacelle 100 and engine 200 to the wing 400 of the aircraft 1. In the embodiment shown in FIG. 1a, the pylon 300 is coupled to a top of the nacelle 100 and extends away from the nacelle 100 in a vertical direction, orthogonal to the forward direction F. The nacelle 100 comprises a coupling region for coupling the nacelle 100 to the wing 400. The coupling region may have an axis parallel to a longitudinal axis X of the nacelle 100. The longitudinal axis X may be a central axis of the nacelle 100. In the embodiment shown in FIG. 1a, the axis of the coupling region and the longitudinal axis X of the nacelle 100 are substantially parallel in the forward direction F.

The nacelle 100 comprises a fore end 10, a middle portion 20 and an aft end 30. The middle portion 20 is between the fore end 10 and the aft end 30. The fore end 10 and the aft end 30 can each be said to be a portion of the nacelle 100, the fore end 10 being a front portion and the aft end 30 being a rear portion of the nacelle 100. The fore end 10, middle portion 20 and aft end 30 are consecutively arranged and, by way of example, are each shown in separation in the schematic top view of FIG. 2. Each of the fore end 10, middle portion 20 and aft end 30 is shown with a general curvature that is biased towards the longitudinal axis X of the nacelle 100 in a fore direction F and/or an aft direction. For example, the fore end 10 has a curvature 12 that is biased towards the longitudinal axis X of the nacelle 100 in a fore direction F, whereas the aft end 30 has a curvature 36 biased towards the longitudinal axis X of the nacelle 100 in the aft direction, opposite the fore direction F. The middle portion 20 has a fore curvature 22 complementary to the curvature 12 of the fore end 10, and an aft curvature 24 complementary to the curvature 36 of the aft end 30.

The aft end 30 is immovable relative to the fore end 10. That is, the aft end 30 is permanently fixed with respect to the fore end 10. Thus, the aft end 30 is not rotatable relative to the fore end 10 and a position of the aft end 30 relative the fore end 10 is fixed to avoid a need for a separate locking mechanism. Changing the orientation of the aft end 30 without changing the orientation of the fore end 10 is therefore not possible.

The aft end 30 comprises a major axis Mj (i.e. a first dimension in a first direction) and a minor axis Mi (i.e. a second dimension in a second direction), as best shown in the representative view of FIG. 1c. The major axis Mj runs between a fore extent 34a, which may be a foremost extent, and an aft extent 34b, which may be an aftmost extent. In contrast to the aft end 30, the fore end 10 may be generally circular when viewed in direction B that is at a plane transverse T to the nacelle (as shown in FIG. 1b), which is an aft direction opposite the fore direction F. The fore end 10 may therefore comprise a diameter D.

The minor axis Mi may be closer to vertical V than the major axis Mj, when the nacelle 100 is coupled to the wing 400 and the aircraft 1 is stationary on the ground. The minor axis Mi is normal to the major axis Mj. The longitudinal axis X may bisect the major Mj and minor Mi axes. A direction of the major axis Mj may complement a direction of the wing 400. For example, the major axis Mj may extend from the fore extent 34a to the aft extent 34b in a direction complementary to a direction of the leading edge 410 of the wing 400.

Figure 2:
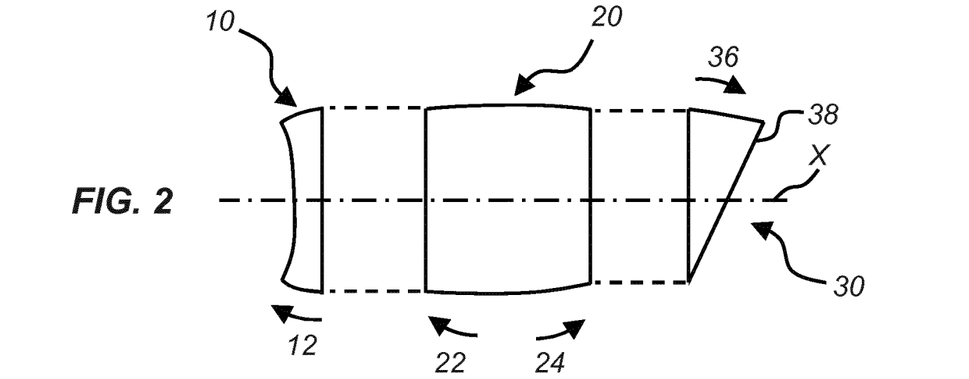

In this embodiment, the major Mj and minor Mi axes define an ellipse, as shown in FIG. 1a, when looking in direction A, as shown in FIG. 1c. That is, the aft end 30 is elliptical. The ellipse exists on a plane away from a plane transverse to the nacelle. A transverse direction is a direction normal to the longitudinal direction X. In some embodiments, the ellipse may exist on the plane transverse to the nacelle, for example in the aircraft embodiments shown in FIG. 6 to FIG. 9. When the ellipse is formed away from the transverse plane, the aft end 30 may be said to be scarfed, for example as shown in the views of FIG. 1a and FIG. 2. That is a nozzle of the nacelle 100, which is an opening at the outlet, may be appear wedge-shaped when looking at the nacelle 100 from above. The minor axis Mi may have length Li that is 90% or more of a length Lj of the major axis Mj. That is, the length Li of the minor axis Mi may be up to 10% less than a length Lj of the major axis Mj. More specifically, the length Li of the minor axis Mi may be 1% to 5% less than a length Lj of the major axis Mj. Said differently, the minor axis Mi may have length Li that is 95% to 99% of a length Lj of the major axis Mj.

An aft end 30 comprising a minor axis Mi closer to vertical V than a major axis Mj may improve the installation of a leading-edge device comprising a flap. For example, in the embodiment shown in FIG. 1a, a gap G, may be employed to bring the nacelle 100 closer to the wing 400 of the aircraft 1 due to the use of the minor axis Mi. The gap G is a longitudinal spacing between the aft end 30 and the wing 400 in a direction of the longitudinal axis X. Such an orientation may reduce or avoid the need for a so called "cut-back" of the leading-edge device to avoid a clash with the leading-edge device. This may be beneficial in a high-lift scenario when the aircraft requires greater lift forces to be generated, such as during take-off. Additionally, or alternatively, a ground clearance of the nacelle 100 when installed on the aircraft wing 400 can be increased or the height of a landing gear of the aircraft reduced.

The aft end 30 may comprise an outer shape that is substantially a truncated cone. The truncated cone comprises a truncated portion at an aft location and a base portion opposite the truncated portion at a fore location. The base portion may be normal to a longitudinal axis X and the truncated portion may be angled relative to the base and the longitudinal axis X.

In some embodiments, the middle portion 20 may have a shape that is generally symmetric about a plane of reference passing through the longitudinal axis X. Said plane of reference may further pass through an axis of the described coupling region of the nacelle 100. This symmetry is shown in FIG. 1a and FIG. 2 when looking in a direction parallel to the plane of reference. In contrast, the aft portion 30 is asymmetrical about the plane of reference. In some embodiments, the aft end 30 comprises an opening that this biased towards an inbound side 102 of the nacelle 100. The inbound side 102 is a side of the nacelle 100 towards a fuselage of the aircraft 1 and a longitudinal centre of the aircraft 1. An outbound side 104 is a side of the nacelle 100 opposite the inbound side 102 and is a side towards a tip 430 of wing 400. An extent of the major axis Mj may be closer to the inbound side 102 than the minor axis Mj. In the example embodiment shown in FIG. 1a, the fore extent 34a is closer to the inbound side 102 than the entire minor axis Mi. The aft extent 34b is further from the inbound side 102 and closer to the outbound side 104 than the entire minor axis Mi.

The aft end 30 may comprise a scarf shape as shown in FIG. 1a and FIG. 2. As shown in FIG. 1a, an angle β between the aft end 30 and a plane transverse to the longitudinal axis X may be present. The angle β may be measured from an opening of the aft end 30. In the embodiment of FIG. 1a, the angle β is shown for demonstration. The angle β of the aft end 30 may be complementary to a sweep angle α. The sweep angle α is measured from the same transverse plane to a leading edge 410 of the wing 400. In some embodiments, the difference between the angle β of the aft end 30 and the sweep angle α, i.e. an angular displacement, may be less than or equal to 5%. In some embodiments, the angle β of the aft end 30 between the aft end 30 and a transverse plane is less than or equal to 40 degrees. Specifically, the angle β between the end aft 30 and a transverse plane is in the range 5 degrees to 35 degrees.

Figure 3:
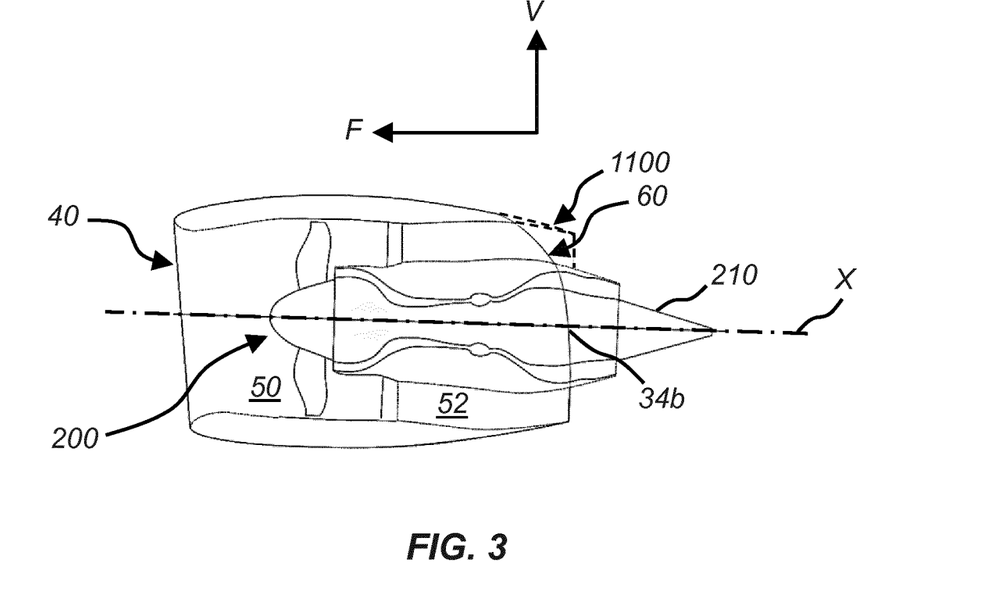
FIG. 3 is a schematic cross-sectional side view from an inbound position of an aircraft system comprising the aircraft engine nacelle of FIG. 1a and an engine of FIG. 1a within the aircraft engine nacelle.

FIG. 3 shows a schematic cross-sectional side view from an inbound side 102 of an aircraft system comprising the aircraft engine nacelle 100 as described in FIG. 1a and the engine 200 also as described in FIG. 1a within the aircraft engine nacelle 100. As shown in FIG. 3, the nacelle 100 may comprise an inlet 40 arranged at the fore end 10, an outlet 60, arranged at the aft end 30 and a passageway 50 in communication with the inlet 40 and outlet 60. The outlet 60 is permanently fixed with respect to the inlet 40. The inlet 40 is an opening that receives intake air for the engine 200. The outlet 60 is an opening for exhausting bypass air. The passageway 50 may comprise a bypass portion 52 which is configured for interaction with bypass air. The aft extent 34b of the major axis Mj is shown at the same position in the vertical direction V as the longitudinal axis X and the engine axis.

A comparison of the nacelle 100 to a conventional nacelle 1100 is shown in FIG. 3. The conventional nacelle 1100 is shown using dashed lines, particularly when compared to the aft end 30. The shape of the aft end 30 of the nacelle 100 described herein allows the nacelle 100 to be closer to a wing 400 of an aircraft 1 because the minor axis Mi of the aft end 30 is reduced compared to the major axis Mj of the aft end 30. An aft end of the conventional nacelle 1100 is shown with a consistent diameter. In the example shown in FIG. 3 to FIG. 5, the shape of the aft end 30 differs from a conventional aft end above the longitudinal axis X. When the aft end 30 comprises a scarf nozzle, a majority of the scarf nozzle is above a central axis of the nacelle 100, wherein the central axis may correspond to the longitudinal axis X. For example, a scarfed portion above the longitudinal axis X may be up to double the size of a scarfed portion below the longitudinal axis X.

Figure 4:
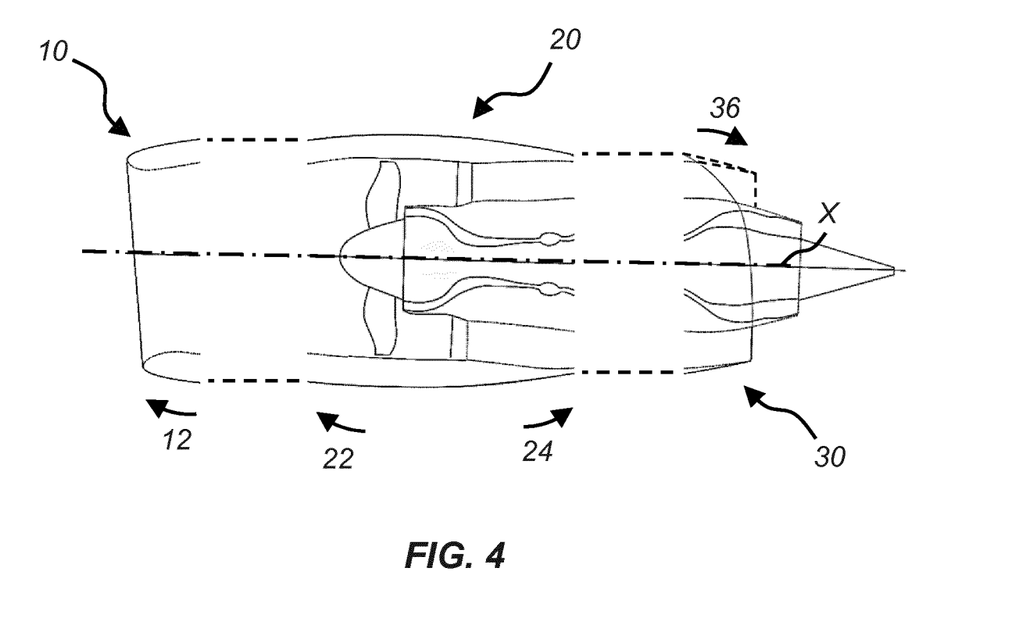
FIG. 4 is a schematic cross-sectional side view from an inbound position of portions of the aircraft system of FIG. 3.

As shown in FIG. 4, the fore end 10, the middle portion 20 and the aft end 30 of the nacelle 100 are consecutively arranged, similarly to that shown in FIG. 2. Each of the fore end 10, middle portion 20 and aft end 30 is shown with a general curvature that is biased towards the longitudinal axis X of the nacelle 100 in a fore direction F and/or an aft direction. For example, the fore end 10 has a curvature 12 that is biased towards the longitudinal axis X of the nacelle 100 in a fore direction F, whereas the aft end 30 has a curvature 36 bias towards the longitudinal axis X of the nacelle 100 in the aft direction, opposite the fore direction F. The middle portion 20 has a fore curvature 22 complementary to the curvature 12 of the fore end 10, and an aft curvature 24 complementary to the curvature 36 of the aft end 30. In the embodiment shown, the fore end 10 does not encircle the engine 200, the middle portion 20 encircles a fore portion of the engine 200 and the aft end 30 encircles an aft portion of the engine 200. The exhaust 210 of the engine 200 is not encircled by the aft end 30 of the nacelle 100 and exists away from the aft end 30 of the nacelle 100.

Figure 5:
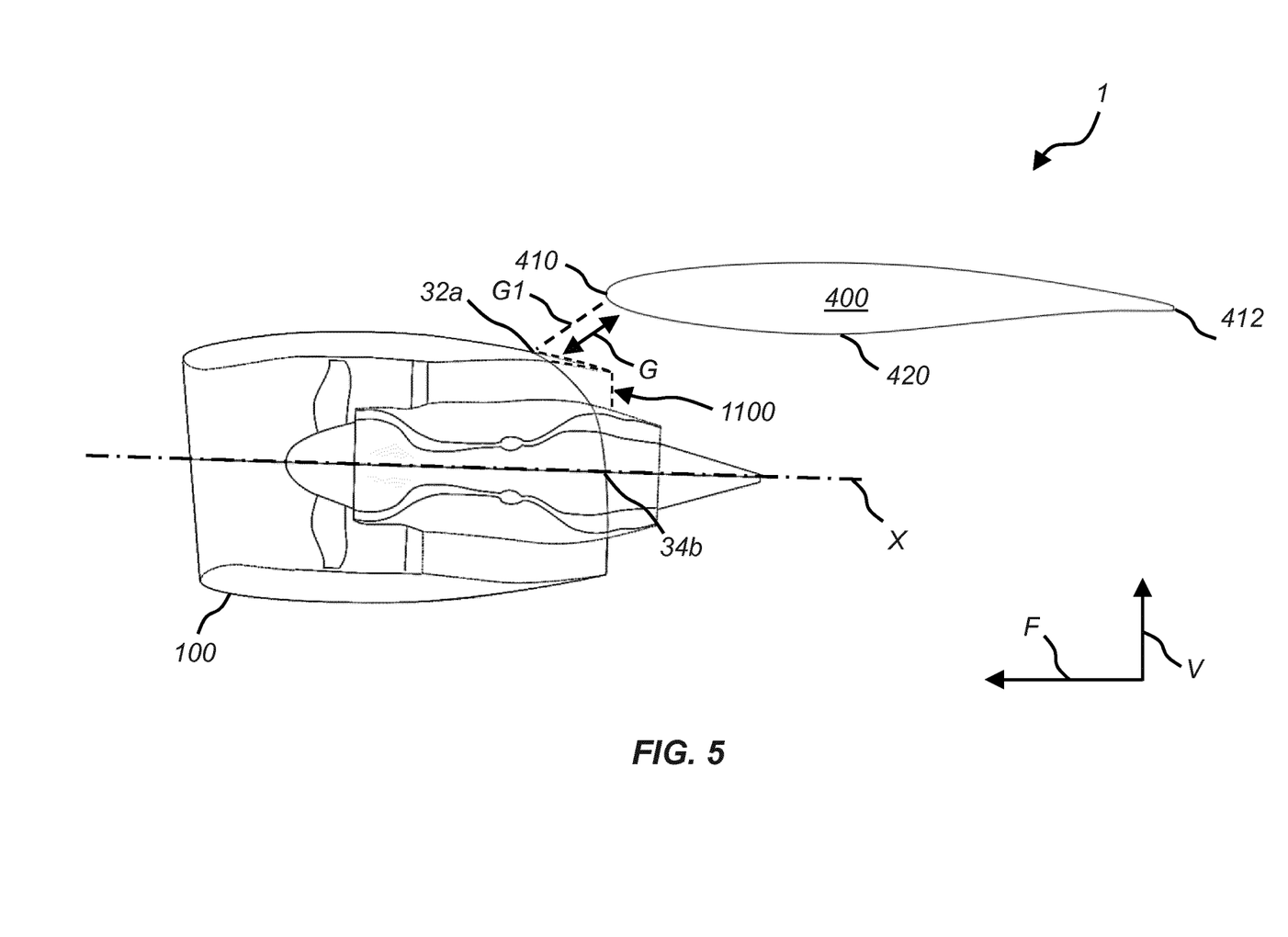
FIG. 5 is a partial schematic cross-sectional side view from an inbound position of an aircraft comprising a wing, an aircraft engine nacelle and an engine within the aircraft engine nacelle.

In some embodiments, as shown in the aircraft 1 of FIG. 5, the nacelle 100 is mountable at a predetermined gap distance G1 from the wing 400. The gap distance G1 is a linear distance measured between a leading edge 410 of the wing 400 and an extent 32a of the minor axis Mi, for example the vertical extent 32a of the minor axis Mi. In some embodiments, the gap distance G1 may be up to two times further forward of the leading edge 410 of the wing 400 than below the leading edge 410 of the wing 400. The vertical extent 32a of the minor axis Mi may be in front of the leading edge 410 of the wing 400. In some embodiments, the aft end 30 may be fore of a leading edge 410 of the wing 400. In comparison to a conventional nacelle 1100, the nacelle 100 in this disclosure can be positioned closer to an under surface 420 of the wing 400. This may allow the nacelle 100 and engine 200 to be moved relatively closer to a trailing edge 412 of the wing 400.

Figure 6:
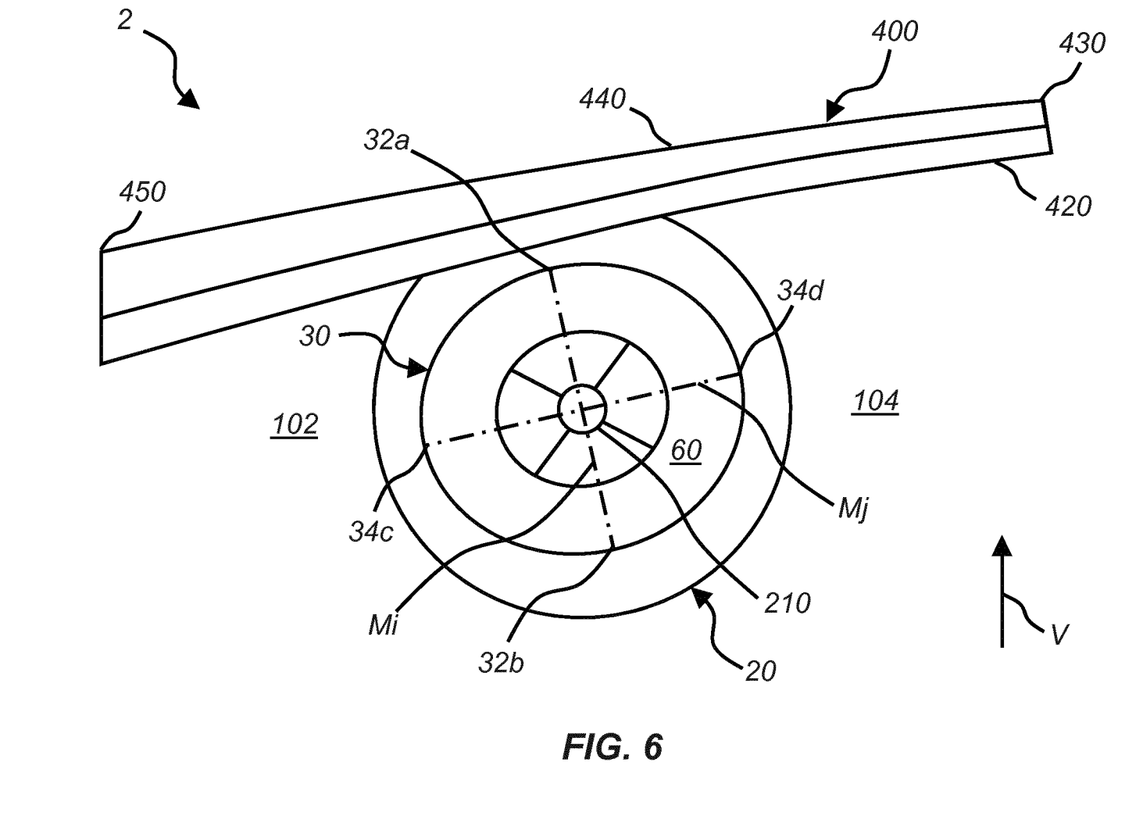
FIG. 6 is a partial schematic rear view of an aircraft comprising a wing, an aircraft engine nacelle and an engine within the aircraft engine nacelle.

Another embodiment of an aircraft 2 is shown in FIG. 6. FIG. 6 shows a partial schematic rear view of an aircraft 2 comprising a wing 400, an aircraft engine nacelle 100 and an engine 200 within the aircraft engine nacelle 100.

In this embodiment, the major axis Mj and the minor axis Mi substantially exist on a transverse plane. That is, when looking into the longitudinal axis X, the aft end 30 is non-circular. Advantageously, the nacelle 100 is installable to either wing 400 of the aircraft 2 and is not dedicated to a certain side of the aircraft 1. Advantageously, the major axis Mj and minor axis Mi allow the aft end 30 to have a reduced size in the vertical direction V (and/or a direction of the minor axis Mi) when compared to a substantially circular aft end with a similar effective area. Similarly, to the previous embodiment, the aft end 30 may be oval or elliptical when viewed in a particular orientation. In contrast to the shape of the aft end 30, the middle portion 20 may be circular. The degree of ovality may be similar to that of the previous embodiment. An aft end 30 having a minor axis Mi allows the nacelle 100 to be arrangeable closer to an under surface 420 and an upper surface 440 of a wing 400. For example, one extent 32a of the minor axis Mi is closer to the under surface 420 of the wing 400 than another extent 32b of the minor axis Mi. An extension of the minor axis Mi intersects an extension of the wing 400. Furthermore, the major axis Mj is complementary in direction to a direction of the wing 400, i.e. the direction from a root 450 of the wing 400 located at an inbound side 102 to a tip 430 of the wing 400 located at an outbound side 104. Advantageously, the reduced vertical distance at the aft end 30 caused by the introduction and orientation of the minor axis Mi helps reduce exhaust impingement on the trailing edge flaps. This can help lower the surface temperature of the wing 400 because a cooler region of exhaust gas interacts with an under surface of the wing 400.

Figure 7:
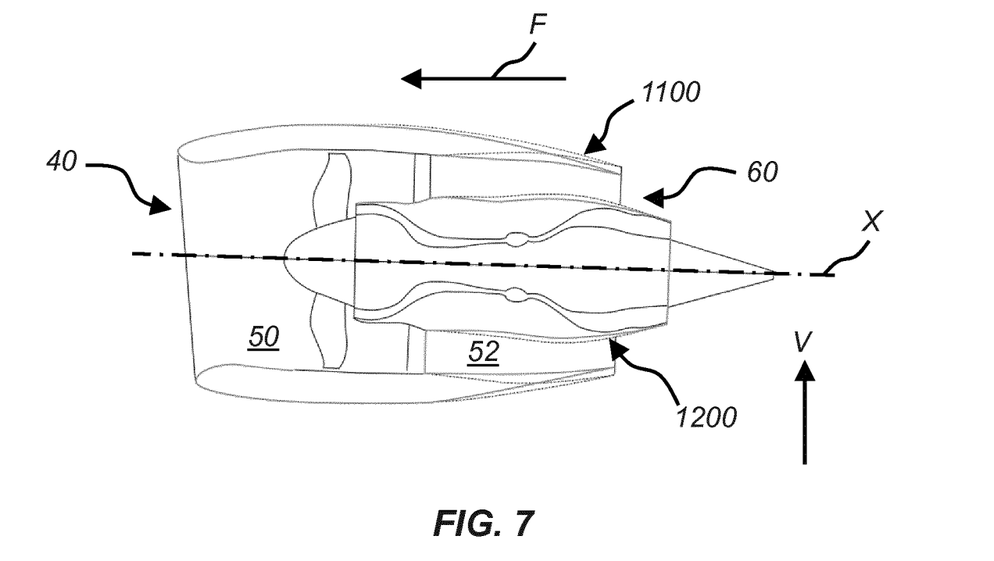
FIG. 7 is a schematic cross-sectional side view from an inbound position of an aircraft system comprising an aircraft engine nacelle and an engine within the aircraft engine nacelle.
Figure 8:
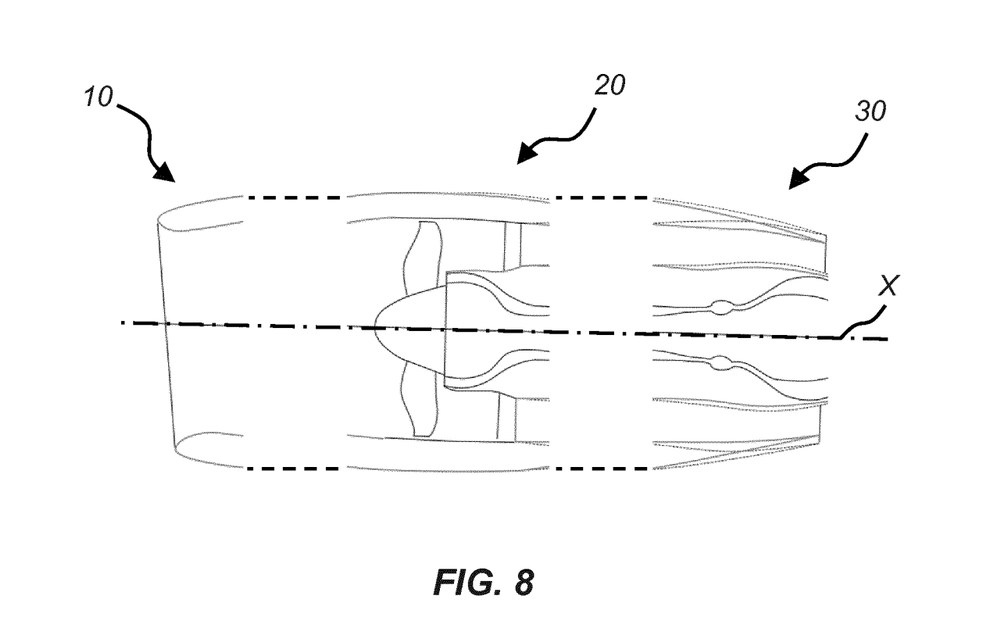
FIG. 8 is a schematic cross-sectional side view from an inbound position of portions of the aircraft system of FIG. 7.

Referring to FIG. 7 and FIG. 8 a schematic cross-sectional side view from an inbound side 102 of an aircraft system comprising an aircraft engine nacelle 100 and an engine 200 within the nacelle 100, and separated portions of the aircraft system in the same side view are respectively shown. A conventional nacelle 1100 and a conventional engine 1200 are shown that are greater in vertical dimension than the nacelle 100 and engine 200 according to this disclosure, respectively. The reduced vertical extent of the nacelle 100 and engine 200 at the aft end 30 allow the nacelle 100 and engine 200 to reduce or avoid the need for a cut-back in a leading-edge device and/or increase ground clearance. When increased ground clearance is not critical, reduced landing gear height may be used, which helps to reduce a weight of the aircraft. The effects associated with the orientation of the minor axis Mi are most useful when an increased bypass engine is used. In FIGS. 7 and 8, a periphery of the engine in a region of the aft end 30 comprises a major axis and minor axis corresponding to the major axis Mj and minor axis Mi of the nacelle 100. This part of the engine may be referred to as the core. The periphery may define the outer limit of the core that contributes to a definition of an annular shape of the bypass portion 52.

Figure 9:
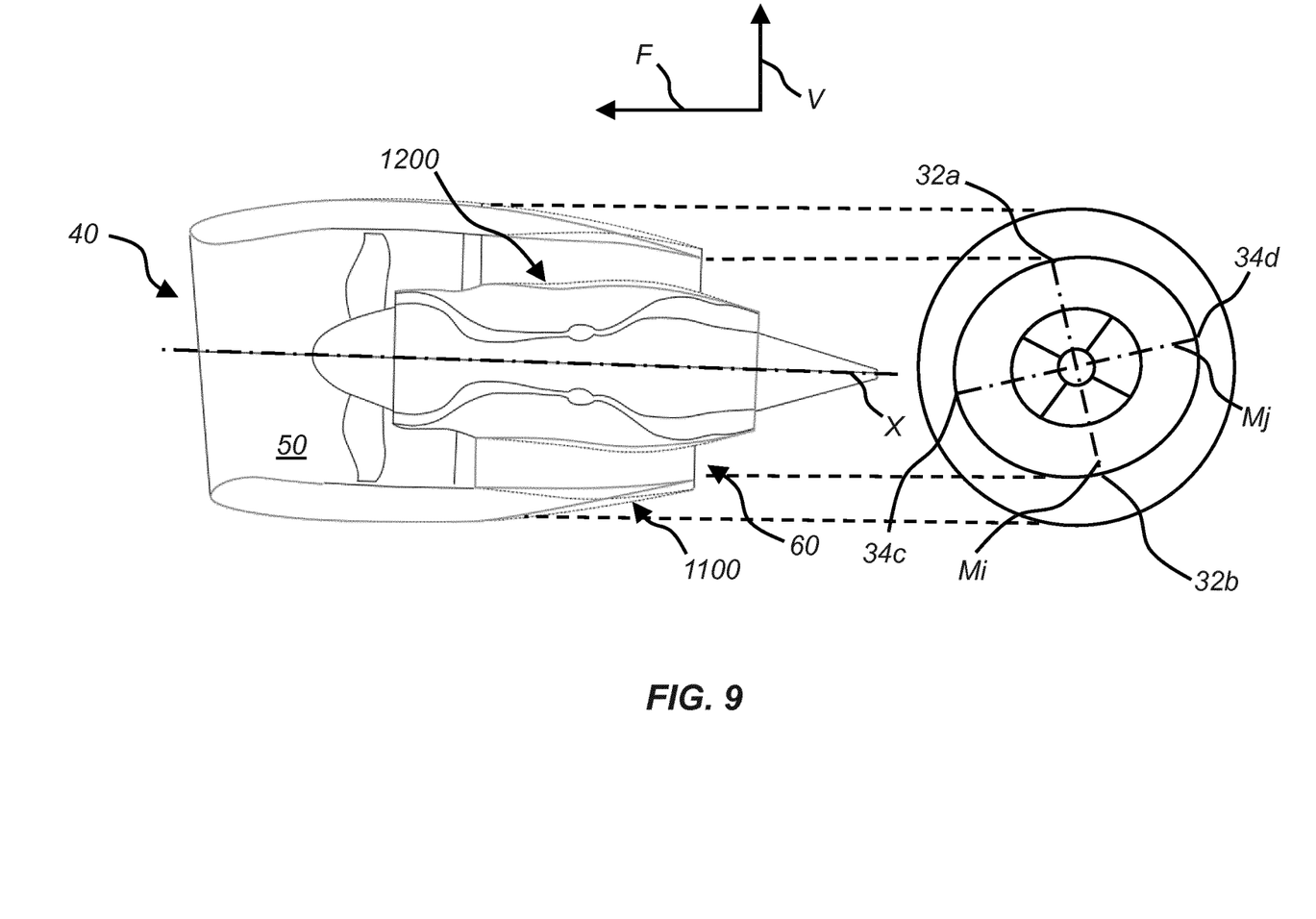
FIG. 9 is a partial schematic cross-sectional side view from an inbound position of the aircraft system as shown in FIG. 7 (left portion of FIG. 9), in combination with a schematic rear view of the engine of the aircraft of FIG. 6 (right portion of FIG. 9)

FIG. 9 shows a partial schematic cross-sectional side view from an inbound side 102 of the aircraft system as shown in FIG. 7 (left portion of FIG. 9), in combination with a schematic rear view of the engine 200 of the aircraft of FIG. 6 (right portion of FIG. 9). The four dashed horizontal lines between the left and right portions demonstrate the alignment of components between the left and right portions.

Figure 10:
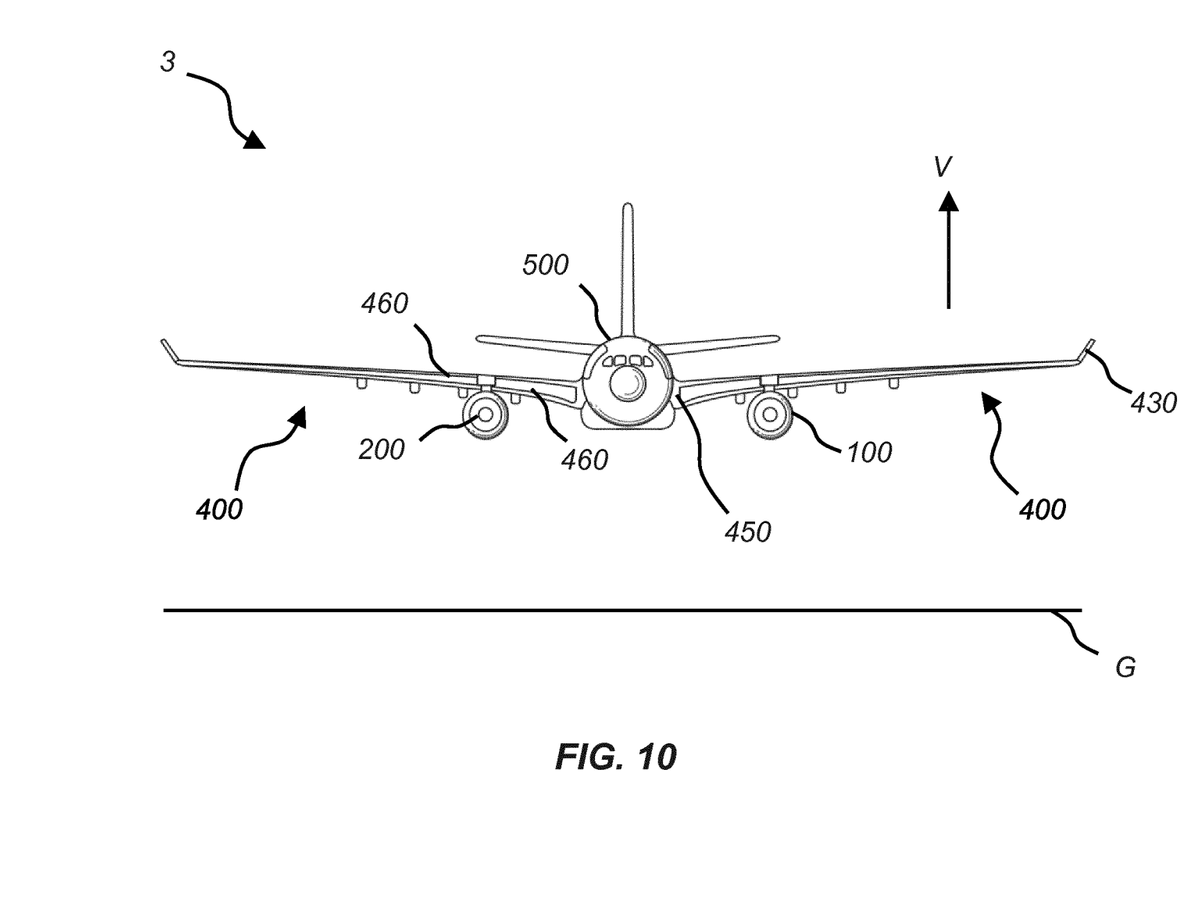
FIG. 10 is a schematic front view of an aircraft.

FIG. 10 shows a schematic front view of an aircraft 3. The aircraft 3 may be any one of the aircraft 1,2 discussed herein. The aircraft 3 may also comprise any of the aircraft engine nacelles 100 and/or aircraft systems discussed herein.

FIG. 10 shows a fuselage 500 of the aircraft 3 which has a longitudinal axis parallel to the fore direction. Each wing 400 extends away from the aircraft 3 from a root 450 to a tip 430. An inbound region in relation to a nacelle 100 of the aircraft is therefore between the nacelle 100 and a fuselage 500 (as well as between the nacelle 100 and the root 450 of the wing 400). In contrast, an outbound region in relation to the nacelle 100 is between the nacelle 100 and the tip 430 of the wing 400. A leading-edge device 460 is shown in FIG. 10, which may be a flap or set of flaps that are configured to move relative to a main body of the wing 400 and are deployed in a high-lift scenario. Although a landing gear of the aircraft 3 is not deployed, the view of FIG. 10 corresponds to an orientation of the aircraft 3 when on the ground (G) with the vertical direction V in an upward direction.

Advantageously, features of the embodiments described herein provide a nacelle that reduces or avoids the need for a "cut-back" in a leading-edge device. This helps with low aircraft speed performance and aids the high-lift scenario of the aircraft to help generate more lift when needed, such as during take-off. Alternatively, or additionally, a reduced landing gear height is possible and/or increased ground clearance. Furthermore, an under surface of the wing is exposed to cooler exhaust gases and the impingement of the engine and/or the exhaust gases on the flaps is reduced. Advantageously, the nacelle described herein is favourable to high bypass ratio engines and helps to lower engine installation drag.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft comprising:
   a wing having a leading edge with a non-zero sweep angle;
   an engine nacelle coupled to the wing, wherein the nacelle comprises
      a fore end;
      an aft end that is immoveable relative to the fore end;
      wherein the aft end comprises a major axis and a minor axis;
      wherein the major axis of the aft end is substantially parallel to the leading edge of the wing in the mounted configuration of the engine nacelle to the aircraft wing; and
      wherein the engine nacelle is configured such the minor axis is closer to vertical than the major axis, when the nacelle is coupled to the wing and the aircraft is stationary on the ground.

2. The aircraft according to claim 1, wherein a length of the minor axis is 1% to 30% less than a length of the major axis.

3. The aircraft according to claim 2, wherein the length of the minor axis is 1% to 5% less than the length of the major axis.

4. The aircraft according to claim 1, wherein an extent of the major axis is closer to an inbound side of the nacelle than the minor axis.

5. The aircraft according to claim 1, wherein the aft end comprises an opening facing towards an inbound side of the nacelle.

6. The aircraft according to claim 1, wherein the major axis comprises a fore extent that is closer to the fore end than an aft extent of the major axis.

7. The aircraft according to claim 1, wherein an angle between the aft end defining a substantially vertical plane and a plane transverse to the nacelle is less than or equal to 40 degrees.

8. The aircraft according to claim 1, wherein the aft end comprises a scarf nozzle.

9. The aircraft according to claim 1, further comprising an engine within the nacelle;
   wherein the major and minor axes of the nacelle pass through a longitudinal axis of the engine.

10. The aircraft system according to claim 9, wherein the engine has a complementary shape to the aft end in a region enclosed by the aft end.

11. The aircraft according to claim 1, wherein an extent of the minor axis is closer to the wing than an extent of the major axis.

12. The aircraft according to claim 1, wherein an extension of the minor axis intersects an extension of the wing.

13. The aircraft according to claim 1, wherein the major axis is complementary in direction to a direction of the wing.

14. The aircraft according to claim 13, wherein the direction of the wing is a direction of a leading edge of the wing.

15. The aircraft according to claim 14, wherein an angular displacement between the major axis and the leading edge of the wing is less than or equal to 15 degrees.

16. The aircraft according to claim 1, wherein the minor axis is fore of a leading edge of the wing.

17. The aircraft according to claim 1, wherein the aft end of the nacelle is fore of the leading edge of the wing.

18. The aircraft according to claim 16, wherein an extent of the minor axis is up to two times further forward of the leading edge of the wing than the extent is below the leading edge of the wing.

19. The aircraft according to claim 1, wherein the major axis is closer to a direction parallel to the wing than the minor axis; and
   wherein the minor axis is closer to a direction perpendicular to the wing than the major axis.

20. An aircraft, comprising:
   a wing having a leading edge with a non-zero sweep angle;
   an engine nacelle coupled to the wing, wherein the nacelle comprises
      an inlet; and
      an outlet;
      wherein the outlet is permanently fixed with respect to the inlet; and
      wherein the outlet comprises:
         a first dimension in a first direction; and
         a second dimension in a second direction orthogonal to the first direction;
      wherein the first dimension is greater than the second dimension; and
   wherein the first direction is substantially parallel to the leading edge of the wing,
   wherein the wing direction is a direction between a root and a tip of the wing.

* * * * *